US011240073B2

(12) United States Patent
Zhang et al.

(10) Patent No.: US 11,240,073 B2
(45) Date of Patent: Feb. 1, 2022

(54) ADAPATIVE RECEIVER WITH PRE-CURSOR CANCELATION

(71) Applicant: Oracle International Corporation, Redwood Shores, CA (US)

(72) Inventors: Xun Zhang, Westford, MA (US); Chaitanya Palusa, Fremont, CA (US); Dawei Huang, San Diego, CA (US); Muthukumar Vairavan, Sunnyvale, CA (US); Jianghui Su, San Jose, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 16/671,146

(22) Filed: Oct. 31, 2019

(65) Prior Publication Data

US 2021/0135907 A1 May 6, 2021

(51) Int. Cl.
*H04L 25/03* (2006.01)
*H04B 1/16* (2006.01)

(52) U.S. Cl.
CPC ......... *H04L 25/03057* (2013.01); *H04B 1/16* (2013.01)

(58) Field of Classification Search
CPC ... H03L 7/0816; H03L 7/0814; H03L 7/0812; H03L 7/0818; H03L 7/091; H03L 7/087; H03L 7/0891; H03L 7/10; H03L 7/0992; H03L 7/0997; H03L 7/104; H03L 7/14; H04L 25/00; H04L 25/02; H04L 25/03; H04L 25/14; H04L 25/03006; H04L 25/03012; H04L 25/03019; H04L 25/03057; H04L 25/03063; H04L 25/03095; H04L 25/03108; H04L 25/03267; H04B 1/16
See application file for complete search history.

(56) References Cited

U.S. PATENT DOCUMENTS

| | | | | |
|---|---|---|---|---|
| 7,339,988 | B1 * | 3/2008 | Shanbhag | H04L 25/03044 375/232 |
| 7,526,023 | B1 * | 4/2009 | Shumarayev | H04L 25/03057 375/233 |
| 7,822,111 | B2 * | 10/2010 | Sohn | H04L 25/03038 375/231 |
| 8,181,058 | B2 * | 5/2012 | Su | H04L 7/0054 713/503 |
| 8,599,909 | B2 * | 12/2013 | Doblar | H04L 25/03057 375/224 |

(Continued)

*Primary Examiner* — James M Perez
(74) *Attorney, Agent, or Firm* — Kowert, Hood, Munyon, Rankin & Goetzel, P.C.

(57) ABSTRACT

A data receiver circuit includes a summer circuit configured to receive an input signal that encodes multiple data symbols, and combine the input signal with a feedback signal to generate an equalized input signal, which is used to generate a clock signal. The data receiver circuit also includes multiple data slicer circuits that sample, using the clock signal and multiple voltage offsets, to generate multiple samples for a particular data symbol. A precursor compensation circuit included in the data receiver circuit may generate an output value for the particular data symbol using the multiple samples. The data receiver circuit also includes a post cursor compensation circuit that generates the feedback signal using at least one of the multiple samples and a value of a previously received sample.

20 Claims, 12 Drawing Sheets

(56) References Cited

U.S. PATENT DOCUMENTS

| | | | | |
|---|---|---|---|---|
| 8,693,596 B1* | 4/2014 | Warner | H03G 3/00 | 375/345 |
| 8,705,606 B2* | 4/2014 | Farjad-Rad | H04L 25/03885 | 375/232 |
| 8,737,491 B1* | 5/2014 | Wilson | H04L 25/03343 | 375/246 |
| 8,737,542 B1* | 5/2014 | Venkataraman | H04L 25/067 | 375/341 |
| 8,817,867 B1* | 8/2014 | Annampedu | H04L 25/03057 | 375/233 |
| 8,848,774 B2* | 9/2014 | Zhong | H04L 25/03343 | 375/232 |
| 8,953,669 B2* | 2/2015 | Amamiya | H04B 7/005 | 375/233 |
| 8,976,854 B1* | 3/2015 | Healey | H04L 25/03885 | 375/232 |
| 9,036,757 B1* | 5/2015 | Su | H04L 7/10 | 375/355 |
| 9,036,764 B1* | 5/2015 | Hossain | H03L 7/0891 | 375/376 |
| 9,077,574 B1* | 7/2015 | Healey | H04L 25/03057 | |
| 9,083,366 B1* | 7/2015 | Annampedu | H04L 7/0331 | |
| 9,166,844 B2* | 10/2015 | Chen | H04L 25/03146 | |
| 9,191,245 B2* | 11/2015 | Tan | H04L 25/03057 | |
| 9,215,106 B2* | 12/2015 | Palusa | H04L 25/03057 | |
| 9,215,107 B1* | 12/2015 | De Bernardinis | H04L 7/0062 | |
| 9,252,821 B2* | 2/2016 | Shor | H04L 25/03853 | |
| 9,276,782 B1* | 3/2016 | Zhang | H04L 25/03146 | |
| 9,294,260 B2* | 3/2016 | Giaconi | H04L 7/0332 | |
| 9,313,017 B1* | 4/2016 | Liao | H04L 7/0062 | |
| 9,350,572 B1* | 5/2016 | Kang | H04L 7/033 | |
| 9,397,824 B1* | 7/2016 | Hoshyar | H04L 7/0331 | |
| 9,401,800 B1* | 7/2016 | Kang | H04L 7/0062 | |
| 9,432,176 B2* | 8/2016 | Yu | H03L 7/091 | |
| 9,438,409 B1* | 9/2016 | Liao | H04L 7/0087 | |
| 9,455,848 B1* | 9/2016 | Zhang | H04L 7/0062 | |
| 9,553,742 B1* | 1/2017 | Xu | H04L 25/0384 | |
| 9,565,037 B1* | 2/2017 | Liu | H04L 25/03057 | |
| 9,628,119 B2* | 4/2017 | Gal | H03F 1/3241 | |
| 9,654,310 B1* | 5/2017 | Chang | H04L 25/03057 | |
| 9,705,708 B1* | 7/2017 | Jin | H04L 25/03885 | |
| 9,787,505 B2* | 10/2017 | Lim | H04L 25/0272 | |
| 9,800,438 B1* | 10/2017 | Zhang | H04L 7/0087 | |
| 9,813,227 B2* | 11/2017 | Su | H04L 7/0087 | |
| 9,882,795 B1* | 1/2018 | Zhang | H04L 7/0087 | |
| 9,893,924 B2* | 2/2018 | Smail | H04L 27/265 | |
| 10,135,643 B1* | 11/2018 | Kong | H04L 25/03057 | |
| 10,348,535 B1* | 7/2019 | Kumar | H04L 25/03019 | |
| 10,467,366 B2* | 11/2019 | Xu | G06F 30/367 | |
| 10,547,475 B1* | 1/2020 | Gagnon | H04L 25/03057 | |
| 10,637,690 B1* | 4/2020 | Tsai | H04L 25/0292 | |
| 10,791,009 B1* | 9/2020 | Wu | H04L 25/03885 | |
| 10,892,763 B1* | 1/2021 | Hidaka | H03L 7/0807 | |
| 10,904,044 B2* | 1/2021 | Palusa | H04L 25/14 | |
| 10,911,272 B2* | 2/2021 | Palusa | H04L 25/03885 | |
| 11,038,768 B1* | 6/2021 | Madrigal | H04L 41/145 | |
| 2003/0185324 A1* | 10/2003 | Chen | H04L 7/0029 | 375/355 |
| 2003/0189997 A1* | 10/2003 | Shanbhag | H04L 25/03878 | 375/348 |
| 2003/0189998 A1* | 10/2003 | Phanse | H04L 25/03057 | 375/348 |
| 2005/0238093 A1* | 10/2005 | Payne | G01R 31/31715 | 375/224 |
| 2005/0271169 A1* | 12/2005 | Momtaz | H03G 3/3084 | 375/345 |
| 2006/0188043 A1* | 8/2006 | Zerbe | H04L 25/03343 | 375/346 |
| 2007/0110148 A1* | 5/2007 | Momtaz | H04L 7/0037 | 375/232 |
| 2007/0177702 A1* | 8/2007 | Sanders | H04L 7/0058 | 375/375 |
| 2008/0048897 A1* | 2/2008 | Parthasarthy | H03M 1/183 | 341/122 |
| 2008/0195363 A1* | 8/2008 | Lytollis | G06F 30/367 | 703/3 |
| 2008/0212607 A1* | 9/2008 | Batty | G06F 13/4072 | 370/464 |
| 2008/0219390 A1* | 9/2008 | Simpson | H04L 7/033 | 375/355 |
| 2009/0102692 A1* | 4/2009 | Pickering | H03K 5/1515 | 341/155 |
| 2009/0154626 A1* | 6/2009 | Anderson | H04L 7/002 | 375/360 |
| 2009/0316769 A1* | 12/2009 | Hidaka | H04L 25/03057 | 375/233 |
| 2010/0080282 A1* | 4/2010 | Zhong | H04L 25/03057 | 375/233 |
| 2010/0098147 A1* | 4/2010 | Miller | H04L 25/03057 | 375/233 |
| 2010/0103998 A1* | 4/2010 | Erba | H04L 25/0307 | 375/233 |
| 2010/0135378 A1* | 6/2010 | Lin | H04L 25/03057 | 375/233 |
| 2010/0238993 A1* | 9/2010 | Huang | H04L 25/03057 | 375/233 |
| 2010/0246650 A1* | 9/2010 | Erb | H04L 1/205 | 375/224 |
| 2010/0284686 A1* | 11/2010 | Zhong | H04L 25/03019 | 398/1 |
| 2011/0167297 A1* | 7/2011 | Su | H04L 7/0054 | 714/15 |
| 2011/0305271 A1* | 12/2011 | Zerbe | H04L 25/03057 | 375/232 |
| 2012/0033685 A1* | 2/2012 | Doblar | H04L 25/061 | 370/535 |
| 2012/0155529 A1* | 6/2012 | Mangaser | H04L 25/03878 | 375/233 |
| 2012/0257652 A1* | 10/2012 | Malipatil | H04L 7/0062 | 375/219 |
| 2013/0148712 A1* | 6/2013 | Malipatil | H04L 25/03885 | 375/233 |
| 2013/0202065 A1* | 8/2013 | Chmelar | H04L 25/03057 | 375/340 |
| 2013/0230092 A1* | 9/2013 | Prokop | H04L 25/03044 | 375/233 |
| 2013/0241622 A1* | 9/2013 | Zerbe | H03K 3/013 | 327/323 |
| 2013/0243066 A1* | 9/2013 | Palusa | H04L 25/03057 | 375/232 |
| 2013/0243127 A1* | 9/2013 | Chmelar | H04L 7/033 | 375/316 |
| 2014/0146867 A1* | 5/2014 | Shvydun | H04L 25/03885 | 375/233 |
| 2014/0169438 A1* | 6/2014 | Lin | H04L 7/0058 | 375/232 |
| 2014/0169440 A1* | 6/2014 | Kotagiri | H04L 25/063 | 375/233 |
| 2014/0192935 A1* | 7/2014 | Palusa | H04L 7/0087 | 375/340 |
| 2014/0225669 A1* | 8/2014 | Zhong | H03F 3/45197 | 330/254 |
| 2014/0269881 A1* | 9/2014 | He | H04L 25/03878 | 375/231 |
| 2014/0355663 A1* | 12/2014 | Kizer | H04L 25/03885 | 375/236 |
| 2015/0043628 A1* | 2/2015 | Rane | H04L 25/03885 | 375/232 |
| 2015/0049798 A1* | 2/2015 | Hossein | H04L 25/03006 | 375/233 |
| 2015/0085914 A1* | 3/2015 | Kizer | H04L 27/06 | 375/233 |
| 2015/0110165 A1* | 4/2015 | Ramadoss | H04L 25/03343 | 375/233 |
| 2015/0180642 A1* | 6/2015 | Hsieh | H04L 25/03057 | 375/233 |
| 2015/0236875 A1* | 8/2015 | Palusa | H03M 1/00 | 375/233 |

(56) References Cited

U.S. PATENT DOCUMENTS

| | | | |
|---|---|---|---|
| 2015/0256363 A1* | 9/2015 | Shvydun | H04L 25/03057 375/233 |
| 2015/0349991 A1* | 12/2015 | Iyer | H04L 7/0062 375/233 |
| 2016/0065394 A1* | 3/2016 | Sindalovsky | H04L 25/03012 375/371 |
| 2016/0352557 A1* | 12/2016 | Liao | H04L 27/3809 |
| 2018/0115442 A1* | 4/2018 | Tajalli | H04L 25/03286 |
| 2018/0183633 A1* | 6/2018 | Ho | H04L 7/033 |
| 2018/0316356 A1* | 11/2018 | Moballegh | H03L 7/087 |
| 2019/0052488 A1* | 2/2019 | Fujii | H04L 25/03076 |
| 2019/0207789 A1* | 7/2019 | Kim | H03F 3/45394 |
| 2020/0092144 A1* | 3/2020 | Ganesan | H04L 25/0216 |
| 2020/0252247 A1* | 8/2020 | Palusa | H04L 25/03878 |
| 2020/0252248 A1* | 8/2020 | Palusa | H04L 25/03057 |
| 2021/0135907 A1* | 5/2021 | Zhang | H04L 7/0058 |
| 2021/0160107 A1* | 5/2021 | Palusa | H04L 25/03878 |
| 2021/0218605 A1* | 7/2021 | Palusa | H04L 25/03038 |

* cited by examiner

ADAPATIVE RECEIVER WITH PRE-CURSOR CANCELATION

BACKGROUND

Technical Field

Embodiments described herein are related to the field of high-speed interface design, and more particularly to canceling inter-symbol interference.

Description of the Related Art

Computing systems typically include a number of interconnected integrated circuits. In some cases, the integrated circuits may communicate using communication channels or links to transmit and receive data bits. The communication channels may support parallel communication, in which multiple data bits are transmitted in parallel, or serial communication, in which data bits are transmitted one bit at a time in a serial fashion.

The data transmitted between integrated circuits may be encoded to aid in transmission. For example, in the case of serial communication, data may be encoded to provide sufficient transitions between logic states to allow for clock and data recovery circuits to operate. Alternatively, in the case of parallel communication, the data may be encoded to reduce switching noise or to improve signal integrity.

During transmission of the data, the physical characteristics of the communication channel may attenuate a transmitted signal associated with a particular data symbol. For example, the impedance of wiring included in the communication channel or link may attenuate certain frequency ranges of the transmitted signal. Additionally, impedance mismatches between wiring included in the communication channel and devices coupled to the communication channel may induce reflections of the transmitted signal, which may also degrade subsequently transmitted signals corresponding to other data symbols.

SUMMARY OF THE EMBODIMENTS

Various embodiments of an apparatus and method for canceling inter-symbol interference in serial data transmission are disclosed. Broadly speaking, a method and apparatus are contemplated, in which, a summer circuit may be configured to receive an input signal that encodes a plurality of data symbols, and combine the input signal with a feedback signal to generate an equalized signal. A clock generator circuit may be configured to generate a clock signal using the equalized signal. A data slicer circuit may be configured to sample, using a plurality of voltage offsets and the clock signal, the equalized signal to generate a plurality of samples of a particular data symbol of the plurality of data symbols. A precursor compensation circuit may be configured to generate an output value for the particular data symbol using the plurality of samples, and a post cursor compensation circuit may be configured to generate the feedback signal using at least one of the plurality of samples and a value of a previously received data symbol. In another non-limiting embodiment, the data slicer circuits may be further configured to sample, using the plurality of voltage offsets, the equalized input signal to generate a plurality of error samples.

BRIEF DESCRIPTION OF THE DRAWINGS

The following detailed description makes reference to the accompanying drawings, which are now briefly described.

Figure 1:
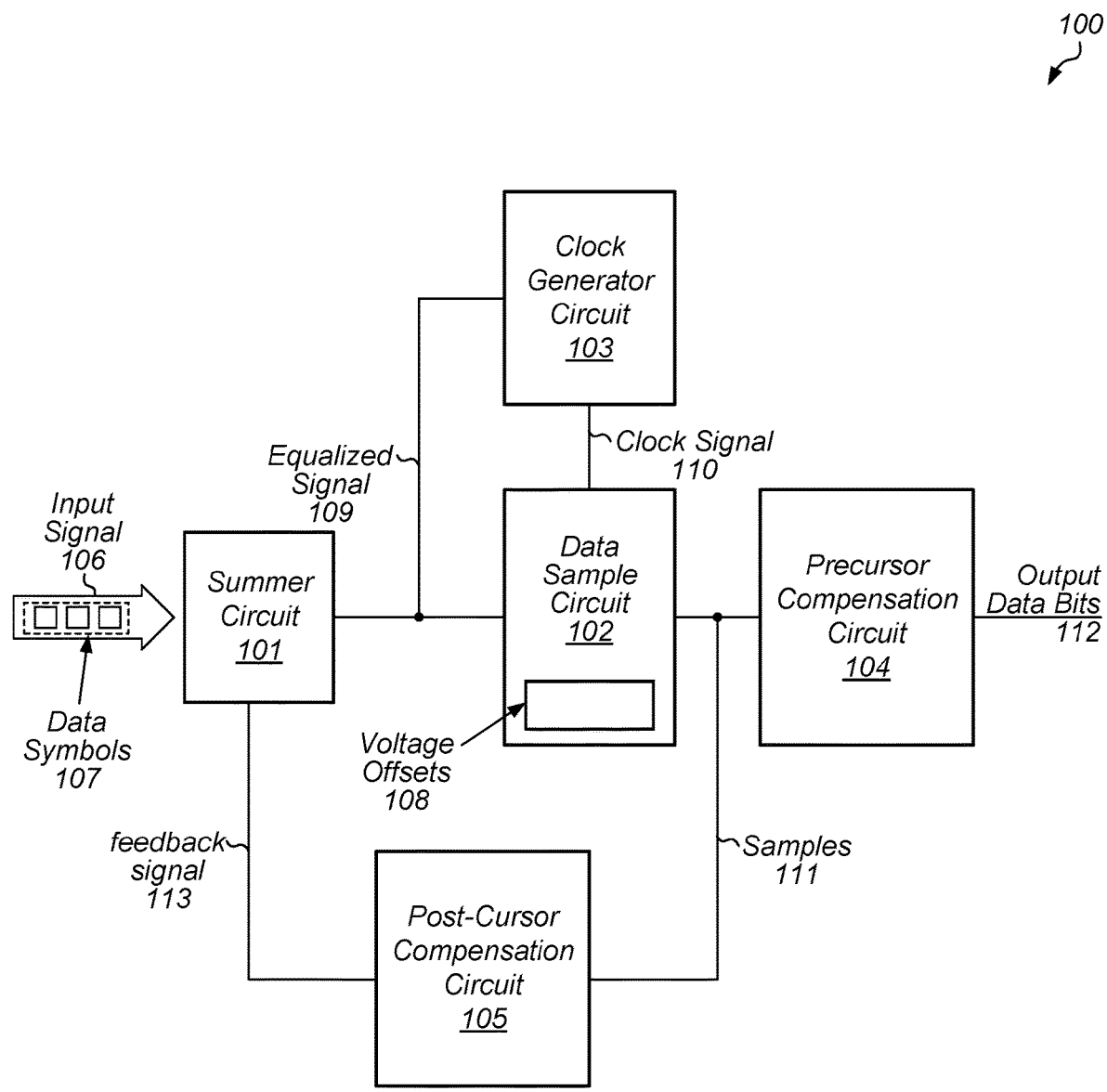
FIG. 1 is a block diagram that illustrates an embodiment of a receiver circuit with pre-cursor cancelation.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

A computing system may include one or more device or integrated circuits, such as, e.g., a central processing unit (CPU) and memories. Each one of the integrated circuits of the computing system may communicate through either a serial or parallel interface. In a parallel interface, multiple data bits are communicated simultaneously, while in a serial interface, data is communicated as a series of sequential single data bits (commonly referred to as "symbols"). When employing a serial interface to communicate data between two devices or integrated circuits included in a computing system, the data may be transmitted according to different protocols. For example, the data may be transmitted using return to zero (RZ), non-return to zero (NRZ), pulse amplitude modulation (PAM), or any suitable combination thereof.

As symbols are transmitted, a signal in which the symbols are encoded may experience distortion. In some cases, the distortion accumulates from the medium through which the signal is propagating in a linear predictable form referred to as Inter-Symbol-Interference or "ISI." As used herein, ISI is an impairment on a currently transmitted symbol results from prior and future symbols. Previous symbols result in post-cursor ISI and future symbols result in pre-cursor ISI.

In order to reduce the effects of ISI in a computer system, various techniques may be employed, such as the use of a decision feedback equalizer (DFE). A DFE operates by sampling an incoming signal to generate a series of data symbols. The series of data symbols, some of which may be scaled, may be used to generate a signal that is combined with the incoming signal to cancel post-cursor ISI. This type of DFE is a causal, which prevents the cancelation of pre-cursor ISI. By only canceling post-cursor ISI, pre-cursor ISI still has a significant impact on the performance of a channel between a transmitter circuit and a receiver circuit.

Various techniques, e.g., pre-cursor pre-emphasis, may be employed to reduce the impact of pre-cursor ISI, but such techniques make adaptation within the receiver circuit difficult as the transmitter circuit does not have information regarding the channel response without communication from the receiver circuit. The embodiments illustrated in the drawings and described herein may provide techniques for mitigating the effects of pre-cursor, while providing for adaption within the receiver circuit.

An embodiment of a data receiver circuit is illustrated in FIG. 1. As illustrated, data receiver circuit 100 includes summer circuit 101, data sample circuit 102, clock generator circuit 103, precursor compensation circuit 104, and post-cursor compensation circuit 105.

Summer circuit 101 is configured to receive input signal 106 that encodes a plurality of data symbols 107, and combine input signal 106 with feedback signal 113 to generate equalized signal 109. In various embodiments, summer circuit 101 may be a particular embodiment of a summing amplifier configured to combine voltage levels of two or more input signals into a single voltage level on an output signal. Summer circuit 101 may include, in various embodiments, a differential amplifier circuit or any other suitable amplifier circuit that may be used as a gain stage in a summing amplifier.

Clock generator circuit 103 is configured to generate clock signal 110 using the equalized signal 109. In some embodiments, clock generator circuit 103 may be configured to perform a process commonly referred to as "clock recovery" using equalized signal 109 in order to generate clock signal 110. Clock generator circuit 103 may, in various embodiments, employ a phase detector circuit, along with a phase-locked or delay-locked loop circuits, latch circuits, flip-flop circuits, and any other suitable combination of analog or digital circuits.

Phase detector circuits employed by clock generator circuits, such as clock generator circuit 103, may be either linear or non-linear. For example, clock generator circuit 103 may use a non-linear bang-bang phase detector that is configured to compare a negative edge of clock signal 110 to a particular transition on equalized signal 109 for a current data symbol and different transition on equalized signal 109 a previous data symbol. Using results of the comparison, timing of clock signal 110 may be adjusted using a delay-locked or phase-locked loop. Alternatively, clock generator circuit 103 may employ a Mueller-Muller phase detector circuit configured to equalize respective amplitudes of samples taken before an after a pulse of clock signal 110 by adjusting the timing of clock signal 110. It is noted that although only two types of phase detector circuits are described, in other embodiments, any suitable phase detector circuit may be employed.

Data sample circuit 102 is configured to sample, using voltage offsets 108 and clock signal 110, equalized signal 109 to generate samples 111 of a particular data symbol of data symbols 107. It is noted that some of samples 111 may be used to determine output data bit 112 (data samples), while others of samples 111 (error samples) may be used to perform adaptation within data receiver circuit 100. As described below in more detail, data sample circuit 102 may include multiple data slicer circuits each coupled to a respective one of voltage offsets 108. A particular data slicer circuit, which may be a particular embodiment of a differential amplifier or other suitable circuit, may be configured to compare a voltage level of equalized signal 109 to a voltage level of the data slicer circuit's corresponding voltage offset signal when clock signal 110 is asserted.

Precursor compensation circuit 104 is configured to generate output data bit 112 for the particular data symbol of the data symbols 107 using samples 111. As described below in more detail, precursor compensation circuit 104 may be a particular embodiment of an unrolled-loop decision feedback equalizer circuit that selects between different ones of samples 111. In some cases, the selection is made using samples from one or more of data symbols 107 that were received prior to the particular data symbol.

Post-cursor compensation circuit 105 is configured to generate feedback signal 113 using at least one sample of samples 111 associated with the particular data symbol and a different sample associated with a different data symbol of data symbols 107 received prior to the particular data symbol. In various embodiments, post-cursor compensation circuit 105 may be a particular embodiment of a decision feedback equalizer (DFE) or other suitable circuit configured to adjust a voltage level of feedback signal 113 using values of previously received data symbols.

It is noted that the embodiment depicted in FIG. 1 is merely an example. In other embodiments, different circuit blocks or different arrangements of circuits blocks may be employed.

Figure 2:
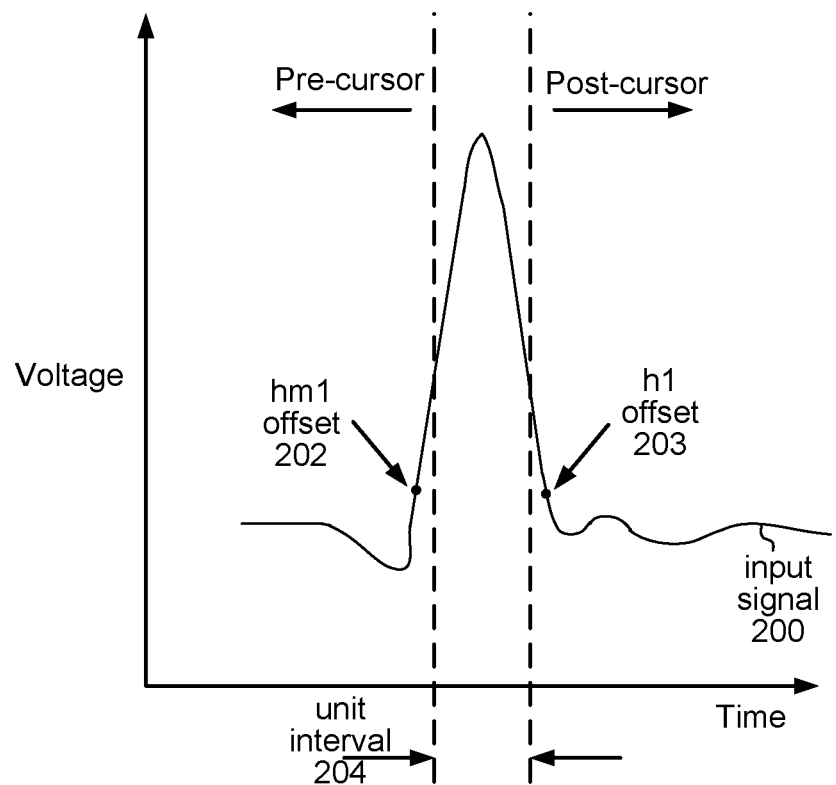
FIG. 2 illustrates an input signal waveform.

As noted above, when a particular data symbol is transmitted from a transmitter circuit to a receiver circuit, the signal encoding the particular data symbol may be affected by previously transmitted data symbols as well as data symbols transmitted after the particular data symbol. The resultant effect of the precursor and post-cursor symbols is illustrated in the example waveform depicted in FIG. 2.

As illustrated, the variation in the voltage level of input signal 200 as a function of time is depicted. In various embodiments, input signal 200 may correspond to input signal 106 as depicted in FIG. 1. Contributions from a precursor symbol are indicated by hm1 offset 202, and a contribution from a post-cursor symbol is indicated by h1 offset 203.

In some cases, prior to transmission, input signal 200 may be modified using a finite impulse response (FIR) filter to cancel the precursor contribution to the input signal 200. The usefulness of such filtering is limited as it may reduce the dynamic range of input signal 200 at the transmitter circuit, as well as introduce other precursor contributions to input signal 200.

Residual precursor contributions may adversely affect the performance of a communication channel or link. The amount of input signal 200 may be modified by the FIR filter to cancel precursor effects is limited as the more emphasis that is used for a first precursor symbols generates a larger residue for other precursor symbols. Residual precursor contributions may result in clock data recovery circuits to lock early, or result in edge/data offsets less that halt of unit interval (UI) 204.

Figure 3:
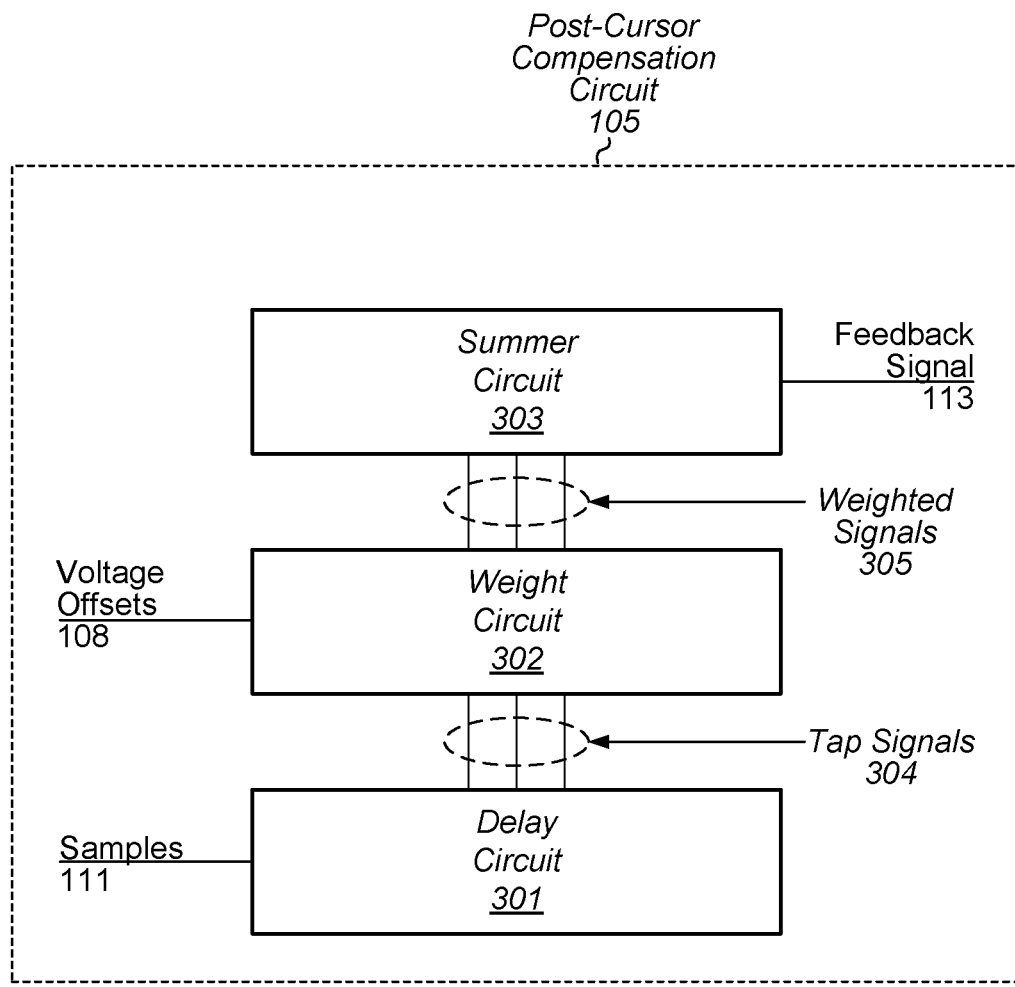
FIG. 3 is a block diagram that illustrates an embodiment of a post-cursor compensation circuit.

Post-cursor compensation circuit 105 may be a particular embodiment of a FIR filter. A block diagram illustrating an embodiment of post-cursor compensation circuit 105 is depicted in FIG. 3. As illustrated, post-cursor compensation circuit 105 includes delay circuit 301, weight circuit 302, and summer circuit 303.

Delay circuit 301 receives samples 111 and generates tap signals 304. Each of tap signals 304 is a replica of samples 111, delayed by a particular period of time. For example, an initial one of tap signals 304 is delayed from samples 111 by the particular period of time. A next one of tap signals, subsequent to the initial one of tap signals 304, is delayed from the initial one of tap signals 304 by the particular period of time. Delay circuit 301 may include multiple latch circuits, flip-flop circuits, or any other circuits suitable for generating the desired delay between tap signals.

Weight circuit 302 is configured to generate weight signals 305 using tap signals 304 and voltage offsets 108. In various embodiments, weight circuit 302 may generate a particular voltage on a given one of weight signals 305 using a value of a corresponding one of tap signals 304 and a corresponding one of voltage offsets 108. Weight circuit 302 may include multiple amplifier circuits, which may be configured to buffer, based on, at least in part, tap signals 304, respective voltage levels of voltage offsets 108.

Summer circuit 303 may be a particular embodiment of a summing amplifier circuit configured to add respective voltage levels of weight signals 305 to generate feedback signal 113. In various embodiments, summer circuit 303 may be implemented as an operational amplifier or other suitable amplifier circuit configured to generate an output signal whose voltage level is a sum of respective voltage levels of two or more input signals.

Figure 4:
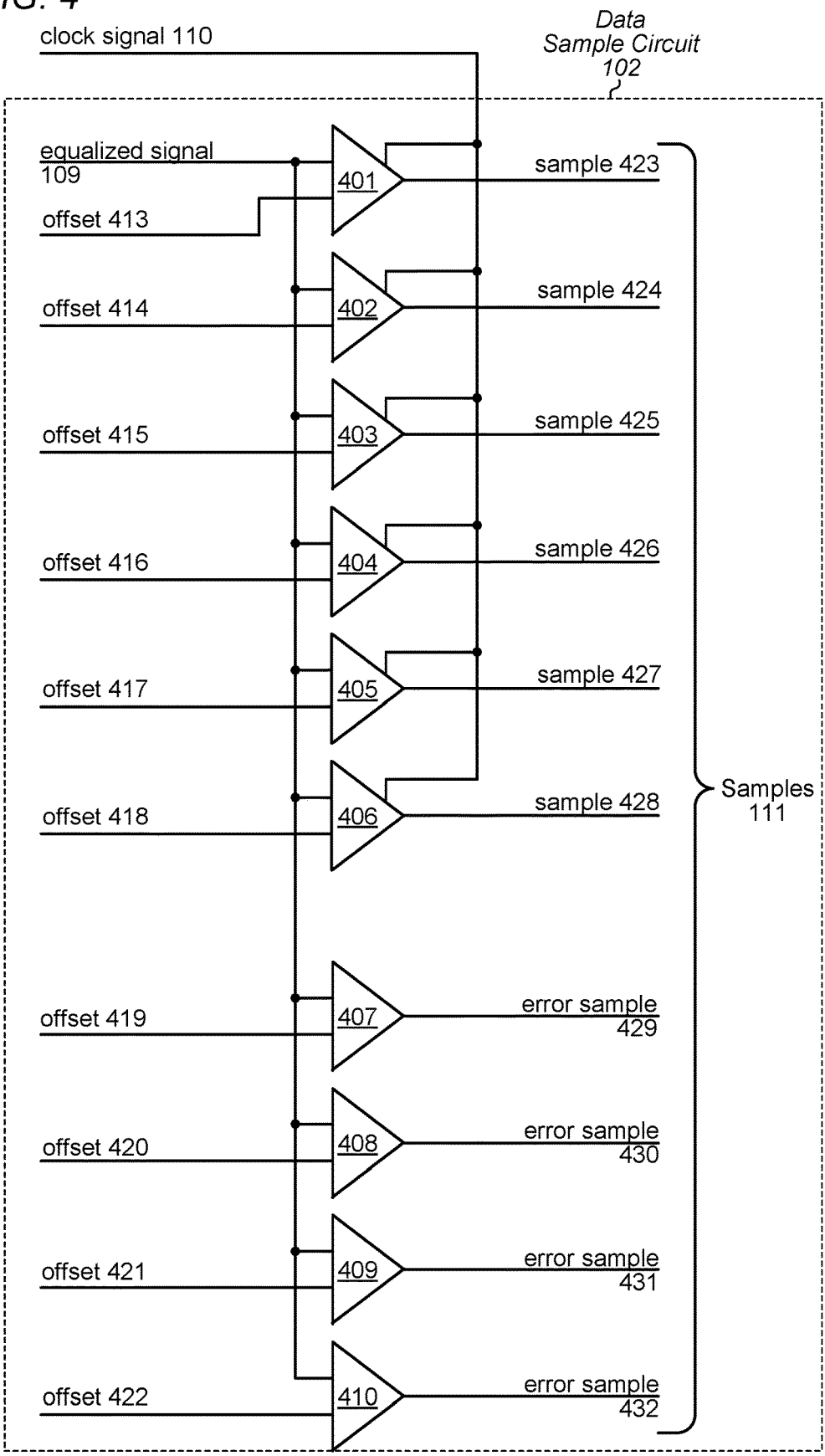
FIG. 4 is a block diagram that illustrates an embodiment of a data slicer circuit.
Figure 5:
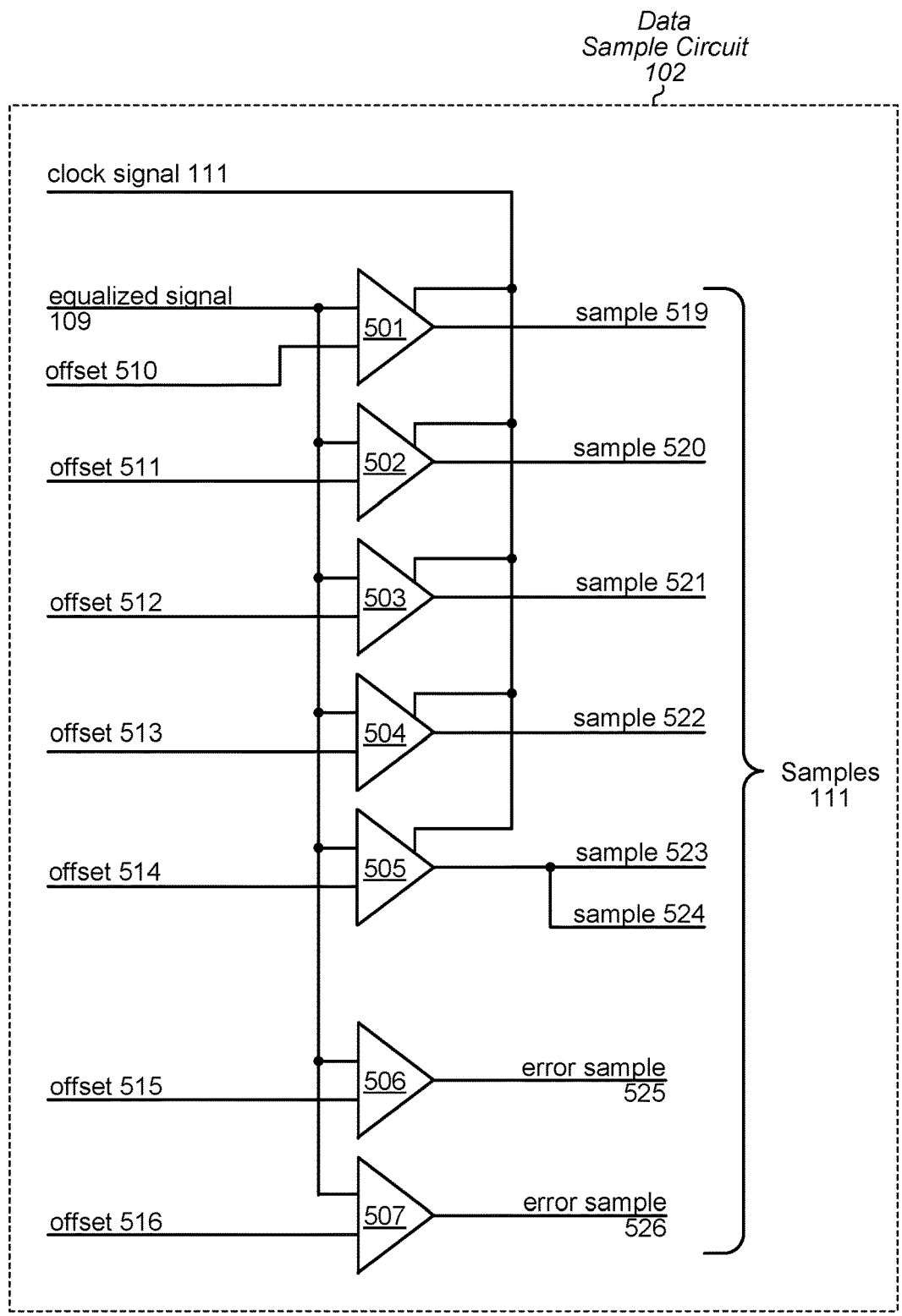
FIG. 5 is a block diagram that illustrates a different embodiment of a data slicer circuit.
Figure 6:
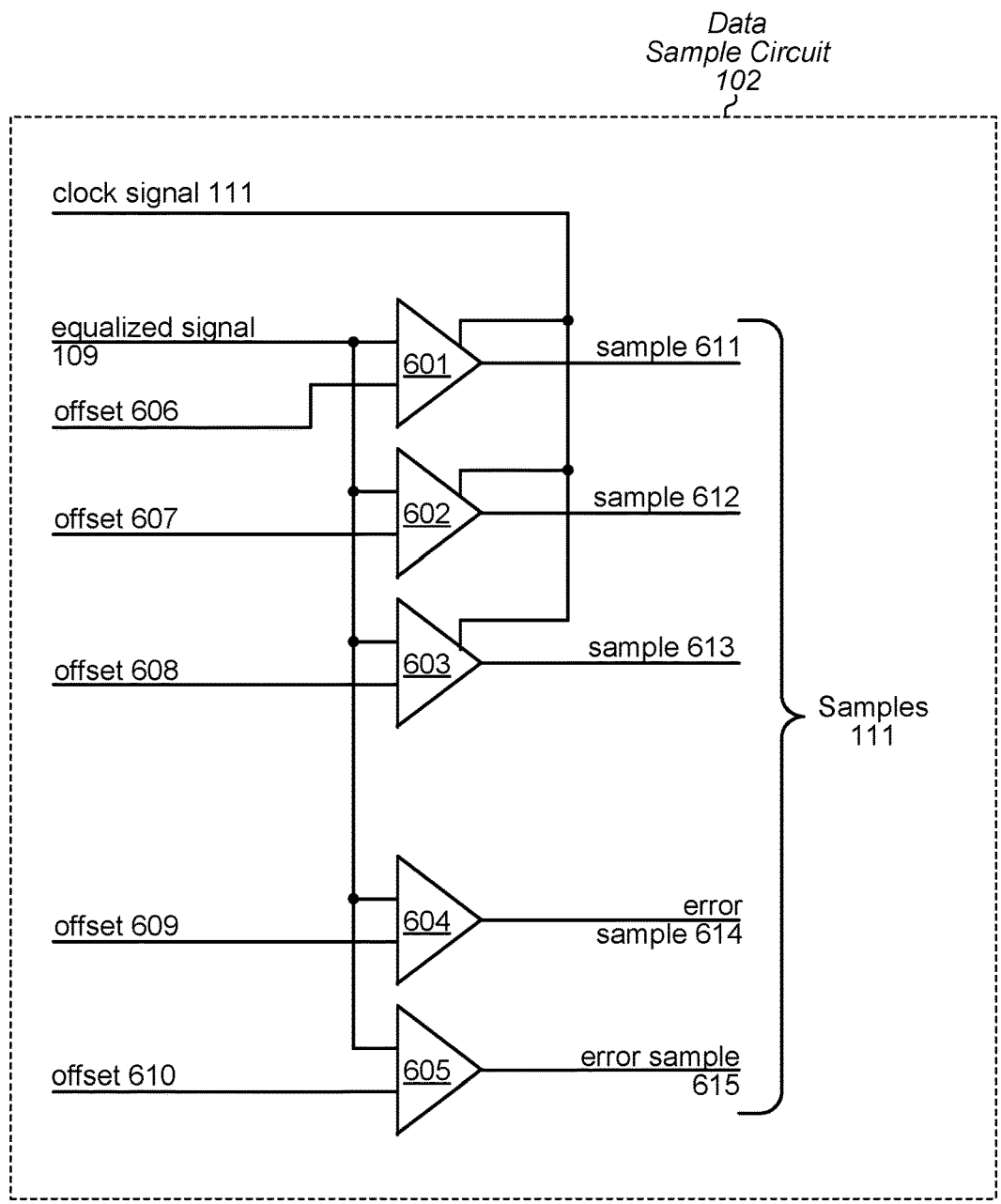
FIG. 6 is a block diagram that illustrates another embodiment of data slicer circuit.

Data sample circuit 102 may implemented according to a variety of circuit topologies employing different numbers of data slicer circuits (or simply "slicer circuits") and offset voltages. FIGS. 4-6 illustrate different circuit topologies that may be employed for data sample circuit 102.

Turning to FIG. 4, a block diagram of an embodiment of data sample circuit 102 is depicted. As illustrated, data sample circuit 102 includes slicer circuits 401-410. Each of slicer circuits 401-410 is coupled to equalized signal 109 and a respective one of offsets 413-422. Slicer circuits 401-406 are configured to generate samples 423-428, respectively, using offsets 413-418, respective. Slicer circuits 407-410 are configured to generate samples 429-432, respectively, using offsets 419-422, respectively. It is noted that offsets 413-422 may be included in voltage offsets 108 and samples 423-432 may be included in samples 111.

A variety of offset values may be used in conjunction with the embodiment illustrated in FIG. 4. A particular set of voltage offset values are illustrated in Table 1. As used herein H0 is a voltage level that corresponds to a target amplitude of equalized signal 109, H1 is a voltage level that corresponds to an effective magnitude of a first post-cursor value, and Hm1 is a voltage level that corresponds to an effective magnitude of a first precursor value.

TABLE 1

| Offset Values for FIG. 4 | |
|---|---|
| Offset | Value |
| 413 | H1 |
| 414 | −H1 |
| 415 | H1 + Hm1 |
| 416 | −H1 − Hm1 |
| 417 | H1 − Hm1 |
| 418 | −H1 + Hm1 |
| 419 | −H0 + H1 + Hm1 |
| 420 | −H0 + H1 − Hm1 |
| 421 | H0 + H1 + Hm1 |
| 422 | H0 + H1 − Hm1 |

Using the offset values listed in Table 1, samples 423 and 424 may be used to generate raw bit decisions within precursor compensation circuit 104. Additionally, slicer circuits 407-410 provide coverage of 50% of the voting pattern possible for a value of a particular symbol, which allows for good tracking of changes in the channel response for the purposed of clock/data recovery.

Each of slicer circuits 401-406 may be a particular embodiment of a clocked differential amplifier circuit configured to generate a digital value using results of a comparison of input signals when a clock signal is asserted. For example, slicer circuit 401 may be configured to generate sample 423 by comparing equalized signal 109 to offset 413 when clock signal 110 is asserted. If, at the time clock signal 110 is asserted, a voltage level of equalized signal 109 is greater than a voltage level of offset 413, sample 423 may be set to a particular logic value. Alternatively, if, at the time clock signal 110 is asserted, the voltage level of equalized signal 109 is less than the voltage level of offset 413, sample 423 may be to a different logic value. In some embodiments, slicer circuits 401-406 may includes a latch or other suitable storage circuit configured to store a particular value of a sample until another assertion of clock signal 110.

Slicer circuits 407-410 may be particular embodiments of a differential amplifier circuit configured generate a digital value using results of a comparison of respective input signals and equalized signal 109. Unlike slicer circuits 401-406, slicer circuits 407-410 do not employ clock signal 110, thereby providing samples that change as the voltage level of equalized signal 109 changes relative to offsets 419-422.

Another embodiment of data sample circuit 102 is depicted in FIG. 5. In this embodiment, data sample circuit 102 includes slicer circuits 501-507. It is noted that slicer circuits 501-505 may be configured to operate in a similar fashion to slicer circuits 401-406 as illustrated in FIG. 4, and that slicer circuits 506 and 507 may be configured to operate in a similar fashion to slicer circuits 407-410.

In the case of the embodiment of FIG. 5, clock generator circuit 103 is configured to lock when H1 is equal to Hm1, which results in a locking point close to a peak in the pulse response received from the communication link. Since H1 and Hm1 are equal less slicer circuits are needed. For example, one less data slicer circuit is employed, along with two fewer error slicer circuits. Additionally, on reference digital-to-analog converter (DAC) may be eliminated. By employing fewer slicer circuits and reference DACs, circuit complexity, area, and power consumption may be reduced.

The voltage offsets for the embodiment of data sample circuit 102 depicted in FIG. 5 are illustrated in Table 2. As above, offsets 510-516 may be include in voltage offsets 108.

TABLE 2

Offset Values for FIG. 5

| Offset | Value |
|---|---|
| 510 | H1 |
| 511 | −H1 |
| 512 | H1 + Hm1 |
| 513 | −H1 − Hm1 |
| 514 | 0 |
| 515 | −H0 |
| 516 | −H0 + H1 + Hm1 |

In some cases, further simplifications to data sample circuit 102 may be made at the expense of performance. An example of such modifications is illustrated in the embodiment of data sample circuit 102 depicted in FIG. 6. As illustrated, the embodiment of data sample circuit 102 of FIG. 6 includes slicer circuits 601-605. It is noted that slicer circuits 601-602 may be configured to operate in a similar fashion to slicer circuits 401-406 as illustrated in FIG. 4, and that slicer circuits 604 and 605 may be configured to operate in a similar fashion to slicer circuits 407-410.

As noted in Table 3 below, the offsets used in the raw bit slicer circuits, i.e., slicer circuits 601 and 602, are a function of both H1 and Hm1. While reducing the need for three additional data slicer circuits from the embodiment of FIG. 4, an error a H1 tap error of 2Hm1 for certain patterns processed by precursor compensation circuit 104.

The voltage offsets for the embodiment of data sample circuit 102 depicted in FIG. 6 are illustrated in Table 3. As above, offsets 606-610 may be include in voltage offsets 108.

| Offset | Value |
|---|---|
| 606 | H1 + Hm1 |
| 607 | −H1 − Hm1 |
| 608 | 0 |
| 609 | −H0 |
| 610 | −H0 + H1 − Hm1 |

Figure 7:
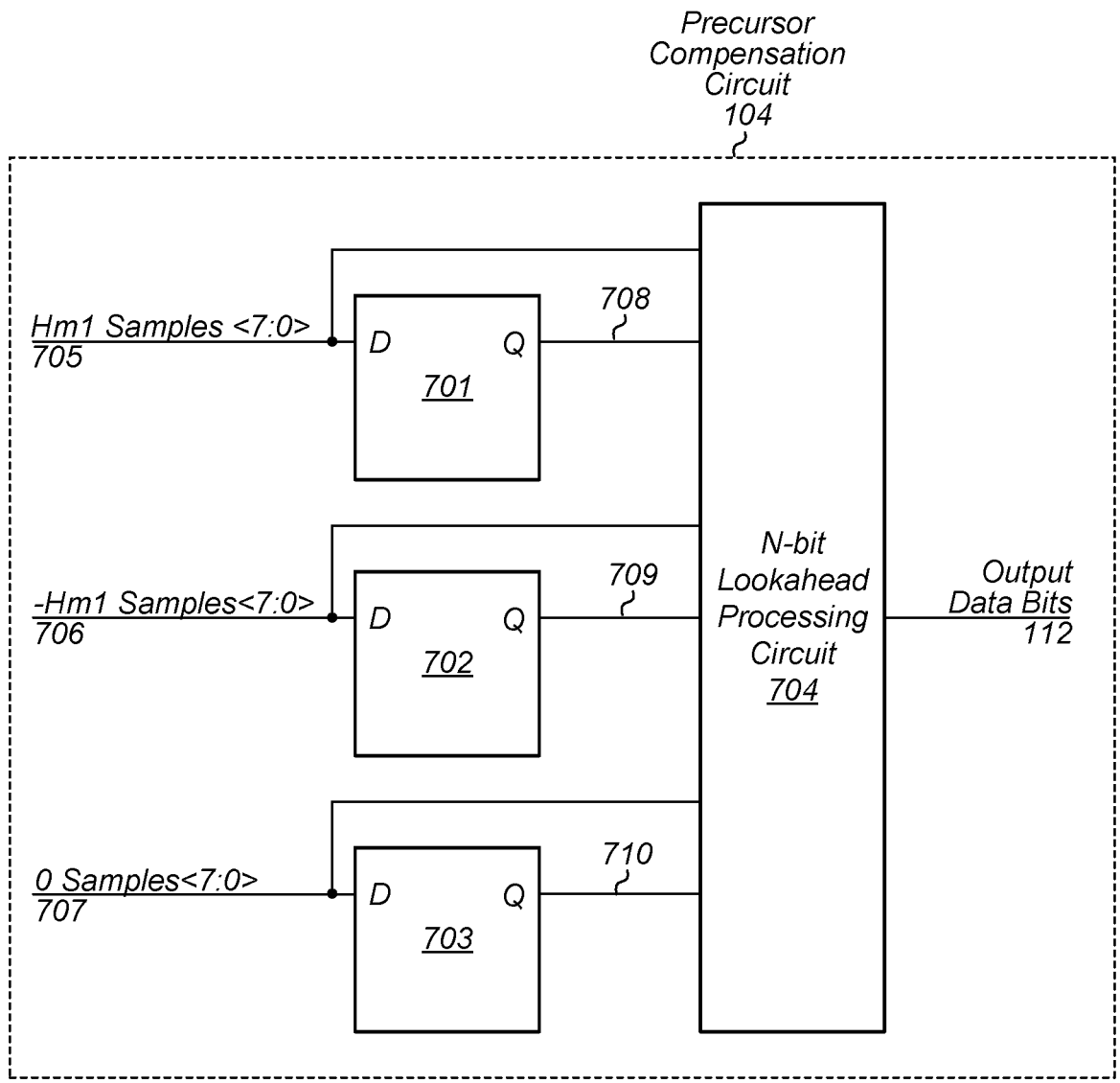
FIG. 7 is block diagram that illustrates an embodiment of a precursor compensation circuit.

Turning to FIG. 7, a block diagram of an embodiment of precursor compensation circuit 104 is depicted. As illustrated, precursor compensation circuit 104 includes latch circuits 701-703, and N-bit lookahead processing circuit 704.

Each of latch circuits 701-703 represents multiple instances of latch circuits, each coupled to different clock signals to capture respective one of Hm1 samples<7:0> 705, −Hm1 samples<7:0>706, and 0 samples<7:0>707, all of which may be included in samples 111. Each of Hm1 samples<7:0>705 is sampled during a respective unit interval using a voltage level corresponding to Hm1. In a similar fashion −Hm1 samples<7:0>706 and 0 samples<7:0>707 are sampled in a similar fashion using a negative version of the voltage corresponding to Hm1, and a voltage level at or near ground potential, respectively. It is noted that although FIG. 7 depicts using eight samples for each input, in various embodiments, any suitable number of samples may be employed.

N-bit lookahead processing circuit 704 may be configured to select a value for a particular data symbol based on values of future data symbols. In various embodiments, N-bit lookahead processing circuit 704 may employ different number of future bits in its determination of the value for the particular data symbol.

In one case, N-bit lookahead processing circuit 704 may employ 1-bit lookahead, where an immediate future data symbol is used to select which one of the precursor bits, i.e., select one of Hm1 samples<7:0>705 or one of −Hm1 samples<7:0>706. Alternatively, N-bit lookahead processing circuit 704 may employ 2-bit future data symbols to select an appropriate one of Hm1 samples<7:0>705 or −Hm1 samples<7:0> as output. It is noted that any suitable number of future data symbols may be employed.

In various embodiments, N-bit lookahead processing circuit 704 may include multiple selection circuits coupled to Hm1 samples<7:0>705, −Hm1 samples<7:0>706, and 0 samples<7:0> 707, as well as signals 708-710. The selection circuits may be arranged in parallel, or series, or any suitable combination thereof.

In various embodiments, the selection circuits may be particular embodiments of a multiplex or other suitable circuits configured to generate output signals by selecting a particular one of multiple inputs using respective control signals. A give selection circuit may, in some embodiments, include one or more pass gates, or multiple logic gates, or any suitable combination thereof.

Structures such as those shown in FIGS. 1-7 for canceling inter-symbol interference may be referred to using functional language. In some embodiments, these structures may be described as including "a means for receiving an input signal that encodes a plurality of data symbols," "a means for combining the input signal with a feedback signal to generate an equalized signal," "a means for generating a clock signal using the equalized signal," and "a means for sampling, using a plurality of voltage offsets and the clock signal, the equalized signal to generate a plurality of samples of a particular data symbol of the plurality of data symbols," "a means for generating an output value for the particular data symbol using the plurality of samples," and "a means for generating the feedback signal using at least one of the plurality of samples and a value of a previously received data symbol."

The corresponding structure for "means for receiving an input signal that encodes a plurality of data symbols" is summer circuit 101 and its equivalents. The corresponding structure for "means for combining the input signal with a feedback signal to generate an equalized signal" is summer circuit 101 and other equivalent circuits. The corresponding structure for "means for generating a clock signal using the equalized signal" is clock generator circuit 103 and its equivalents. Data sample circuit 102 and its equivalents are the corresponding structure for "means for sampling, using a plurality of voltage offsets and the clocks signal, the equalized signal to generate a plurality of samples of a particular data symbol of the plurality of data symbols." The corresponding structure for "means for generating an output value for the particular data symbol using the plurality of samples" is latch circuits 701-703 and N-bit lookahead processing circuit 704, and their equivalents. Delay circuit 301, weight circuit 302, and summer circuit 303 and its equivalents are the corresponding structure for "means for generating the feedback signal using at least one of the plurality of samples and a value of a previously received data symbol."

Figure 8:
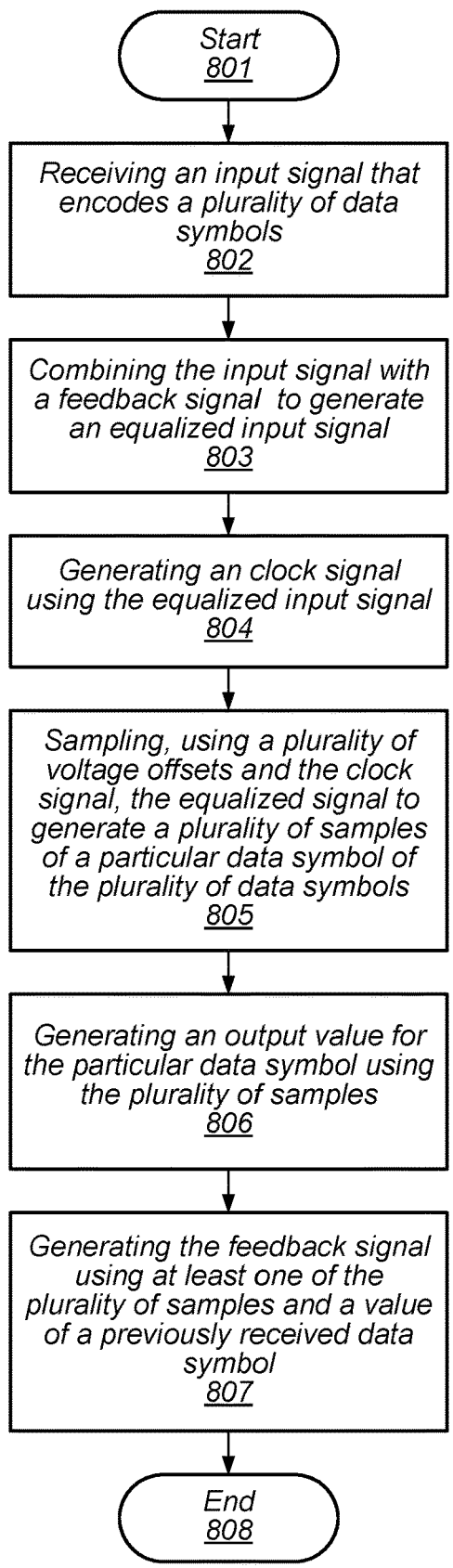
FIG. 8 is a flow diagram depicting an embodiment of a method for operating a data receiver circuit that includes pre-cursor cancelation.

Turning to FIG. 8, a flow diagram depicting an embodiment of a method for operating a data receiver circuit that includes pre-cursor compensation is illustrated. The method, which may be applied to receiver circuit 100 as depicted in FIG. 1, begins in block 801.

The method includes receiving an input signal that encodes a plurality of data symbol (block 802). In various embodiments, the method may include receiving the input signal from a transmitter circuit via a channel. A value of a particular one of the plurality of data symbols may, in some embodiments, may correspond to a plurality of bits.

The method also includes combining the input signal with feedback signal to generate an equalized signal (block 803). In various embodiments, the method may also include adding respective voltage levels of the input signal and the feedback signal to generate the equalized signal.

The method further includes generating a clock signal using the equalized signal (block 804). In various embodiments, the method may also include receiving a reference clock signal, and generating the clock signal using the reference clock signal. In some cases, the method may include phase-locking the clock signal to one or more transitions included in the equalized signal.

The method also includes sampling, using a plurality of voltage offsets and the clock signal, the equalized signal to generate a plurality of samples of a particular data symbol of the plurality of data symbols (block 805). In various embodiments, the method may also include sampling, using the plurality of voltage offsets, the equalized input signal to generate a plurality of error samples. In some cases, the method may include generating the clock signal using the equalized signal and the plurality of error samples.

The method further includes generating an output value for the particular data symbol using the plurality of samples (block 806). In some embodiments, the method may include predicting one or more future data symbols using the plurality of samples. The method may include, in various embodiments, adapting the plurality of voltage offsets using at least one of the one or more future data symbols.

In various embodiments, the plurality of voltage offsets may include a voltage offset corresponding to a contribution to the voltage level of the input signal resulting from a particular future data symbol of the one or more future data symbols. In some cases, the voltage offset corresponding to the contribution to the voltage level of the input signal results from the particular future data symbol is equal to a contribution to the voltage level of the input signal resulting from a particular past data symbol.

The method also includes generating the feedback signal using at least one of the plurality of samples and a value of a previously received data symbol (block 807). In some embodiments, the method may include comparing the equalized signal to a sum of the voltage offset corresponding to the contribution to the voltage level of the input signal resulting from the particular future data symbol and the voltage offset corresponding to a contribution to the voltage level of the input signal resulting from the particular past data symbol. In such cases, the method may also include comparing the equalized signal to a difference between a negative version of the voltage offset corresponding to the contribution to the voltage level of the input signal resulting from the particular future data symbol and the voltage offset corresponding to a contribution to the voltage level of the input signal resulting from the particular past data symbol. The method concludes in block 808.

Figure 9A:
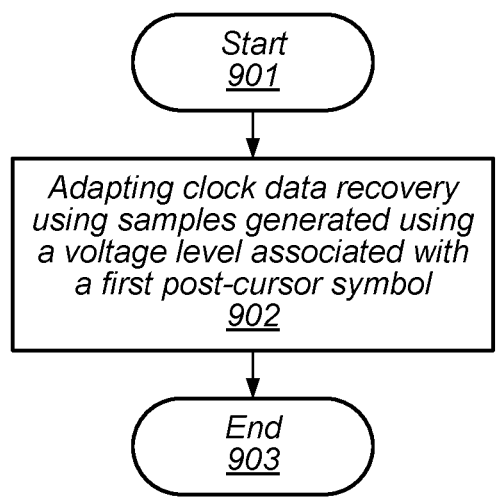
FIG. 9A is a flow diagram depicting an embodiment of a method for adapting clock recovery.

As described above, while receiving data, operational parameters of clock generator circuit 103 may be adjusted or adapted to when equalized signal 109 is sampled during a unit interval. Such an adaptation process may allow for adjustment of the sampling point to maintain the sampling point at or near a peak of the pulse response received via a communication channel or link. An embodiment of a method of for adapting a clock generator circuit is illustrated in FIG. 9A. The method, which may be applied to data receiver circuit 100 and used in conjunction with the method depicted in FIG. 8, begins in block 901.

The method includes adapting clock data recovery using samples generated using a voltage level associated with a first post-cursor symbol (block 902). As described above, different slicer circuits use different comparison voltage levels to generate respective samples. The various samples may be used not only to determine a value for a received symbol, but also to adjust clock data recovery operation. In the present embodiment, only samples generated using the voltage level associated with the first post-cursor symbol may be used. Symbols generated using other voltage levels, which may correspond to other precursor or post-cursor symbols, may be ignored.

In some embodiments, the method may include adjusting one or more operational parameters of clock generator circuit 103. Adjusting such parameters may include writing one or more values into respective control registers included in clock generator circuit 103. The method concludes in block 903.

Figure 9B:
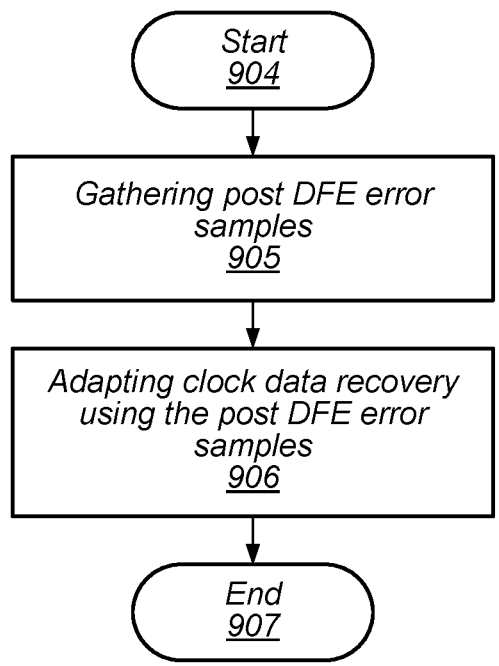
FIG. 9B is a flow diagram depicting another embodiment of a method for adapting clock recovery.

Multiple methods may be used to adapt clock data recovery in a data receiver circuit. An embodiment of another method for adapting clock data recovery is depicted in the flow diagram of FIG. 9B. The method, which may be applied to data receiver circuit 100 and used in conjunction with the method depicted in FIG. 8, begins in block 904.

The method includes gathering post DFE error samples (block 905). As described above, data sample circuit 102 generates not only data samples, but error samples as well. In some cases, the data and error samples are further processed by post-cursor compensation circuit 105 in order to generate feedback signal 113. Error samples that have been processed by post-cursor compensation circuit 105 may be stored in a latch, register, or other suitable storage circuit for later use.

The method also includes adapting clock data recovery using the post DFE error samples (block 906). In this case, adjustments to the operation parameters of clock generator circuit 103 may be made using the error samples, which have been operated upon by post-cursor compensation circuit 105. Other processed samples, or other samples that have not been processed by post-cursor compensation circuit 105 may be ignored.

As with the method depicted in FIG. 9A, the method may include adjusting one or more operational parameters of clock generator circuit 103. In some cases, the adjusting may include writing one or more values into respective control registers included in clock generator circuit 103. The method concludes in block 907.

Figure 10:
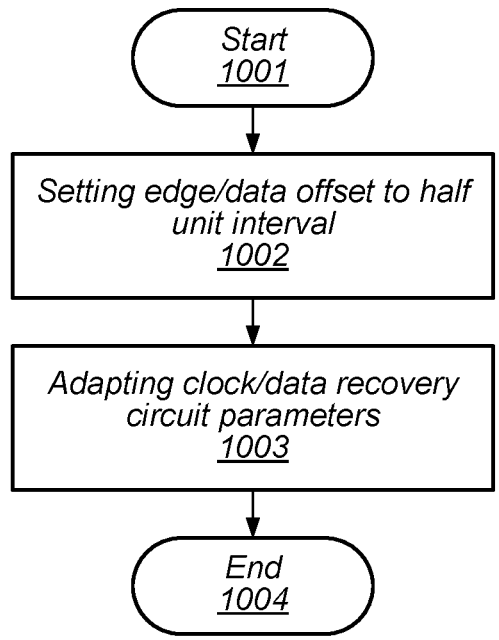
FIG. 10 is a flow diagram depicting an embodiment of a method for performing clock recovery.

Turning to FIG. 10, a flow diagram illustrating an embodiment of a method for performing clock data recovery is depicted. The method, which may be applied to data receiver circuit 100, begins in block 1001.

The method includes setting edge/data offset to half of a unit interval (block 1002). In various embodiments, the edge/data offset is used to sample to equalized signal 109, and is selected to half of the unit interval based on an assumption that equalized signal 109 will be at its maximum value for a particular symbol half way through the unit interval for the particular symbol.

The method further includes adapting clock/data recovery circuitry parameters (block 1003). As characteristics of the communication link or channel changes, the location of a peak of equalized signal 109 may move away from the middle of the unit interval for the particular symbol. When this occurs, the edge/data offset may be adjusted to move it towards the peak of equalized signal 109. In various embodiments, the method may include writing one or more values to registers used by or included in clock generator circuit 103. It is noted that block 1003 may correspond to either of the methods depicted in FIG. 9A or FIG. 9B. The method concludes in block 1004.

Figure 11:
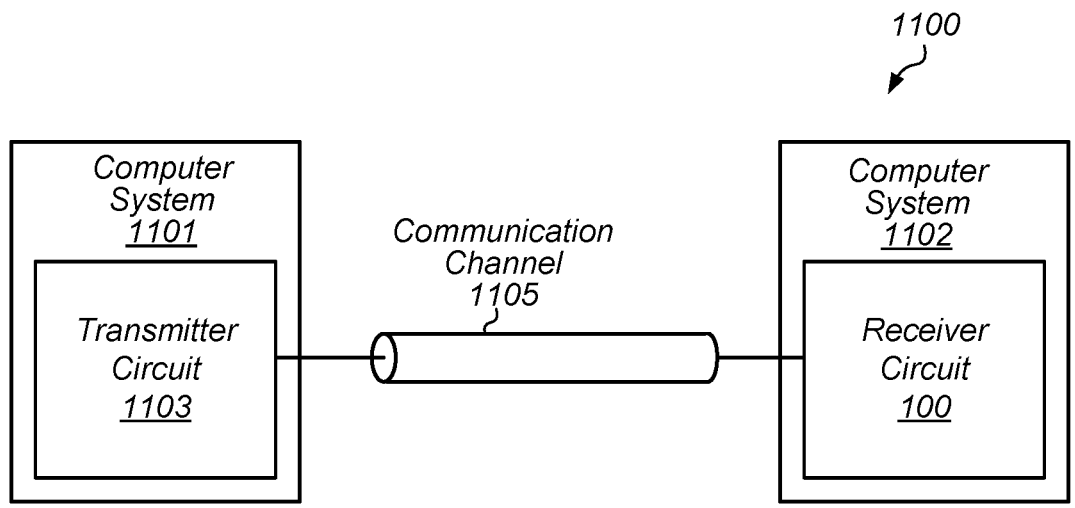
FIG. 11 is a block diagram depicting two devices coupled via a communication channel.

An example of two computer systems coupled via communication channel in a computer network is depicted in FIG. 11. As illustrated, computer network 1100 includes computer systems 1101 and 1102, each coupled to communication channel 1105. It is noted that although only two computer systems are depicted in the embodiment depicted in FIG. 11, in other embodiments, any suitable number of computer systems may be included in computer network 1100.

Computer system 1101 includes transmitter circuit 1103. In various embodiments, transmitter circuit may transmit data to computer system 1102 using communication channel 1105. Transmitter circuit 1103 may reformat data prior to transmitting. Such reformatting may include converting parallel data into a serial stream of data symbols, as well as the addition of error detection and correction data bits.

Communication channel 1105 may include one or more wires, circuit board traces, fiber optic cables, or any other suitable medium capable of propagating a signal that encodes multiple data symbols. In some cases, the medium may be selected to provide a particular impedance between the two computer systems. In such cases, transmitter circuit 1103 and data receiver circuit 100 may include circuit elements to match an impedance of the medium used in communication channel 1105. Although only a single communication channel is depicted in the embodiment of FIG. 11, in other embodiments, any suitable number of communication channels between computer systems 1101 and 1102 may be employed.

As described above, data receiver circuit 100 may be configured to receive the signal transmitted by transmitter circuit 1103 via communication channel 1105. Data receiver circuit 100 may be further configured to compensate for both precursor and post-cursor interference resulting from the transmission of the signal via communication channel 1105, in order to recovery data bits encoded in the signal.

Figure 12:
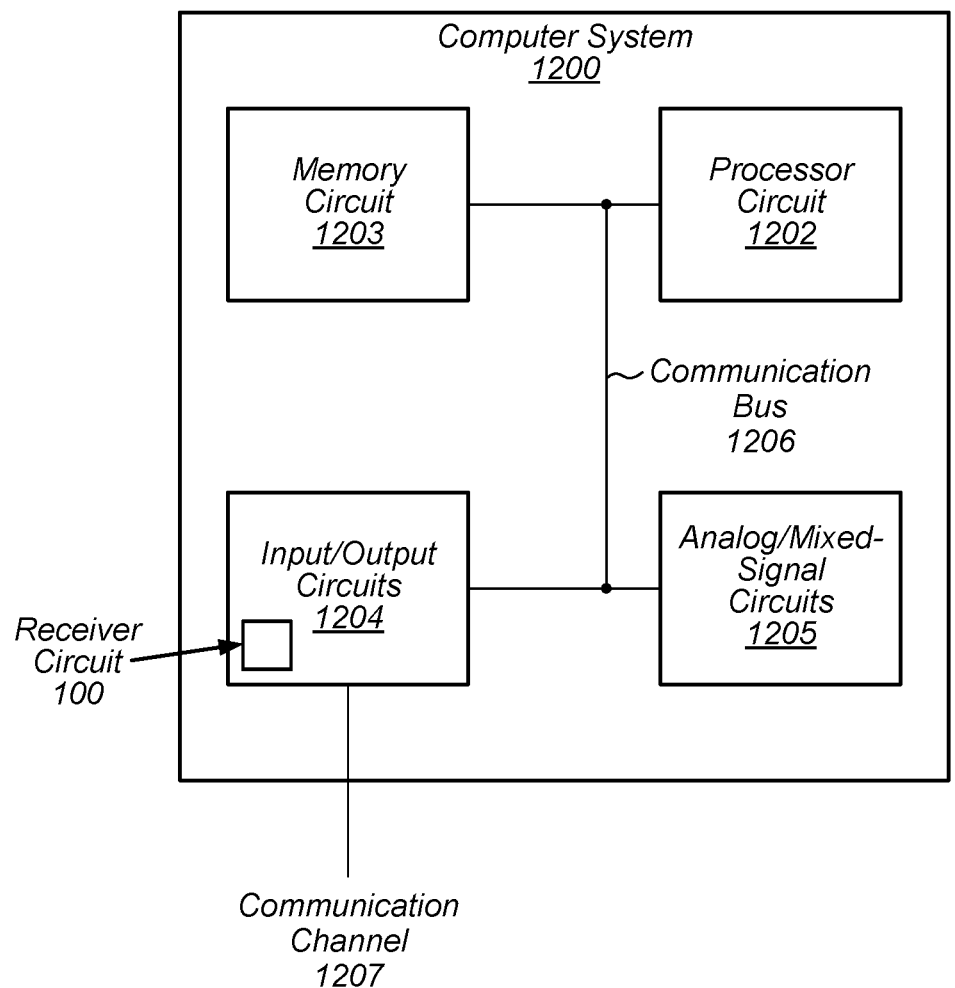
FIG. 12 illustrates an embodiment of a computer system.

A block diagram of a computer system is illustrated in FIG. 12. In the illustrated embodiment, the computer system 1200 includes, processor circuit 1202, memory circuit 1203, input/output circuits 1204, and analog/mixed-signal circuits 1205, each of which may be configured to send and receive data using communication bus 1206. In various embodiments, computer system 1200 may be configured for use in a desktop computer, server, or in a mobile computing application such as, e.g., a tablet, or laptop computer, and may correspond to either of computer system 1101 or computer system 1102 as illustrated in FIG. 11.

Processor circuit 1202 may, in various embodiments, be representative of a general-purpose processor that performs computational operations. For example, processor circuit 1202 may be a central processing unit (CPU) such as a microprocessor, a microcontroller, an application-specific integrated circuit (ASIC), or a field-programmable gate array (FPGA), or other suitable processing circuit.

Memory circuit 1203 may, in various embodiments, include any suitable type of memory such as a Dynamic Random-Access Memory (DRAM), a Static Random-Access Memory (SRAM), a Read-only Memory (ROM), Electrically Erasable Programmable Read-only Memory (EEPROM), or a non-volatile memory, for example. It is noted that in the embodiment illustrated in FIG. 12, a single memory circuit is depicted. In other embodiments, any suitable number of memory circuits may be employed.

Input/output circuits 1204 includes data receiver circuit 100, and may be configured to coordinate data transfer between computer system 1200 and one or more devices using communication channel 1207. In various embodiments, communication channel 1207 may employ a serial data transfer protocol and data receiver circuit 100 may determine values for received data symbols as described above. Such devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1204 may be configured to implement a version of Universal Serial Bus (USB) protocol or IEEE 1394 (Firewire®) protocol. In various embodiments, communication channel 1207 may correspond to communication channel 1105 as illustrated in FIG. 11.

Input/output circuits 1204 may also be configured to coordinate data transfer between computer system 1200 and other computer systems or integrated circuits coupled to computer system 1200 via a network. In one embodiment, input/output circuits 1204 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1204 may be configured to implement multiple discrete network interface ports.

Analog/mixed-signal circuits 1205 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal circuits 1205 may be configured to perform power management tasks with the inclusion of on-chip power supplies and voltage regulators It is noted that the embodiment of a computer system depicted in FIG. 12 is merely an example. In other embodiments, different numbers of circuit blocks, and along with different arrangements of circuit blocks may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a summer circuit configured to:
      receive an input signal that encodes a plurality of data symbols; and
      combine the input signal with a feedback signal to generate an equalized signal;
   a clock generator circuit configured to generate a clock signal using the equalized signal;
   a data sample circuit configured to compare, using the clock signal, the equalized signal to a plurality of voltage offsets to generate a corresponding plurality of samples of a particular data symbol of the plurality of data symbols;
   a precursor compensation circuit configured to:
      determine at least one future data symbol value;
      select, using the at least one future data symbol value, a given one of the corresponding plurality of samples to generate an output value for the particular data symbol; and
   a post-cursor compensation circuit configured to generate the feedback signal using at least one of the corresponding plurality of samples and a value of a previously received data symbol.

2. The apparatus of claim 1, wherein the data sample circuit includes a comprising a plurality of error slicer circuits configured to sample, using one or more voltage offsets of the plurality of voltage offsets, the equalized signal to generate a plurality of error samples.

3. The apparatus of claim 1, wherein the clock generator circuit is further configured to generate the clock signal using the equalized signal and at least one of plurality of error samples.

4. The apparatus of claim 1, wherein to generate the output value for the particular data symbol, the precursor compensation circuit is further configured to predict a given value of a future symbol using the corresponding plurality of samples.

5. The apparatus of claim 4, wherein to generate the feedback signal, the post-cursor compensation circuit is further configured to select a particular sample of the plurality of samples using at least one previously generated sample.

6. The apparatus of claim 4, wherein the plurality of voltage offsets further includes a particular voltage offset corresponding to a first contribution to a voltage level of the input signal resulting from a past data symbol, and a different voltage offset corresponding to a second contribution to the voltage level of the input signal resulting from the future symbol, and wherein the different voltage offset is the same as the particular voltage offset.

7. A method, comprising:
   receiving an input signal that encodes a plurality of data symbols;
   combining the input signal with feedback signal to generate an equalized signal;
   generating a clock signal using the equalized signal;
   comparing, using the clock signal, the equalized signal to a plurality of voltage offsets to generate a corresponding plurality of samples of a particular data symbol of the plurality of data symbols;
   determining at least one future data symbol value;
   selecting, using the at least one future data symbol value, a given one of the corresponding plurality of samples to generate an output value for the particular data symbol; and
   generating the feedback signal using at least one of the corresponding plurality of samples and a value of a previously received data symbol.

8. The method of claim 7, further comprising, sampling, using the plurality of voltage offsets, the equalized signal to generate a plurality of error samples.

9. The method of claim 8, further comprising, generating the clock signal using the equalized signal and the plurality of error samples.

10. The method of claim 7, wherein generating the output value includes predicting one or more future data symbols using the corresponding plurality of samples.

11. The method of claim 10, further comprising, adapting a value of at least one voltage offset of the plurality of voltage offsets using at least one of the one or more future data symbols.

12. The method of claim 10, wherein the plurality of voltage offsets further include a particular voltage offset corresponding to a first contribution to a voltage level of the input signal resulting from a past data symbol, and a different voltage offset corresponding to a second contribution to the voltage level of the input signal resulting from a particular future data symbol of the one or more future data symbols, and wherein the different voltage offset is the same as the particular voltage offset.

13. The method of claim 12, wherein sampling the equalized signal includes:
   comparing the equalized signal to a sum of the particular voltage offset and the different voltage offset; and
   comparing the equalized signal to a difference between a negative version of the different voltage offset and the particular voltage offset.

14. An apparatus, comprising:
   a first computer device configured to transmit a signal that encodes a plurality of data symbols; and
   a second computer device configured to:
      receive the signal;
      combine the signal with a feedback signal to generate an equalized signal;
      generate a clock signal using the equalized signal;

compare, using the clock signal, the equalized signal to a plurality of voltage offsets to generate a corresponding plurality of samples of a particular data symbol of the plurality of data symbols;

determine at least one future data symbol value;

select, using the at least one future data symbol value, a given one of the corresponding plurality of samples to generate an output value for the particular data symbol; and generate the feedback signal using at least one of the corresponding plurality of samples and a value of a previously received data symbol.

15. The apparatus of claim 14, wherein the second computer device is further configured to sample, using the plurality of voltage offsets, the equalized signal to generate a plurality of error samples.

16. The apparatus of claim 15, wherein the second computer device is further configured to generate the clock signal using the equalized signal and the plurality of error samples.

17. The apparatus of claim 14, wherein the second computer device is further configured to predict one or more future data symbols using the corresponding plurality of samples.

18. The apparatus of claim 17, wherein the second computer device is further configured to modify a value of at least one voltage offset of the plurality of voltage offsets using at least one of the one or more future data symbols.

19. The apparatus of claim 17, wherein the plurality of voltage offsets further include a particular voltage offset corresponding to a first contribution to a voltage level of the signal resulting from a past data symbol, and a different voltage offset corresponding to a second contribution to the voltage level of the signal resulting from a particular future data symbol of the one or more future data symbols, and wherein the different voltage offset is the same as the particular voltage offset.

20. The apparatus of claim 19, wherein the second computer device is further configured to:

compare the equalized signal to a sum of the particular voltage offset and the different voltage offset; and compare the equalized signal to a difference between a negative version of the different voltage offset and the particular voltage offset.

* * * * *

UNITED STATES PATENT AND TRADEMARK OFFICE
CERTIFICATE OF CORRECTION

PATENT NO. : 11,240,073 B2
APPLICATION NO. : 16/671146
DATED : February 1, 2022
INVENTOR(S) : Zhang et al.

It is certified that error appears in the above-identified patent and that said Letters Patent is hereby corrected as shown below:

On the Title Page

In Column 1, under Item (54) Title, Line 1, delete "ADAPATIVE" and insert -- ADAPTIVE --, therefor.

In the Specification

In Column 1, Line 1, delete "ADAPATIVE" and insert -- ADAPTIVE --, therefor.

In Column 4, Line 28, delete "an" and insert -- and --, therefor.

In Column 8, Line 38, delete "<7:0> 707," and insert -- <7:0>707, --, therefor.

In Column 12, Line 67, after "regulators" insert -- . --.

In the Claims

In Column 13, Line 53, in Claim 2, delete "includes a comprising" and insert -- comprises --, therefor.

Signed and Sealed this
Thirty-first Day of May, 2022

Katherine Kelly Vidal
*Director of the United States Patent and Trademark Office*